US012763802B2

(12) United States Patent
Ono et al.

(10) Patent No.: US 12,763,802 B2
(45) Date of Patent: Oct. 13, 2026

(54) RADIO FREQUENCY CIRCUIT AND COMMUNICATION DEVICE

(71) Applicant: Murata Manufacturing Co., Ltd., Nagaokakyo (JP)

(72) Inventors: Atsushi Ono, Nagaokakyo (JP); Hirotsugu Mori, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 289 days.

(21) Appl. No.: 18/595,520

(22) Filed: Mar. 5, 2024

(65) Prior Publication Data

US 2024/0283471 A1 Aug. 22, 2024

Related U.S. Application Data

(63) Continuation of application No. PCT/JP2022/033120, filed on Sep. 2, 2022.

(30) Foreign Application Priority Data

Sep. 10, 2021 (JP) ................................ 2021-147530

(51) Int. Cl.
*H04B 1/00* (2006.01)
*H04L 5/14* (2006.01)

(52) U.S. Cl.
CPC ......... *H04B 1/0067* (2013.01); *H04B 1/0057* (2013.01); *H04L 5/14* (2013.01)

(58) Field of Classification Search
CPC ...... H04B 1/0067; H04B 1/0057; H04B 1/00; H04B 1/006; H04B 1/04; H04B 1/40; H04L 5/14; H03H 9/72
See application file for complete search history.

(56) References Cited

U.S. PATENT DOCUMENTS

2019/0229764 A1* 7/2019 Kang ........................ H03F 3/24
2019/0238169 A1* 8/2019 Naniwa ................. H04B 1/006
(Continued)

FOREIGN PATENT DOCUMENTS

JP 2012-034049 A 2/2012
JP 2021-016049 A 2/2021
(Continued)

OTHER PUBLICATIONS

International Search Report and Written Opinion mailed on Dec. 6, 2022, received for PCT Application PCT/JP2022/033120, filed on Sep. 2, 2022, 8 pages including English Translation.

*Primary Examiner* — Chae S Lee
(74) *Attorney, Agent, or Firm* — XSENSUS LLP

(57) ABSTRACT

A radio frequency circuit is a radio frequency circuit capable of simultaneously transmitting an LTE signal and an NR signal, the circuit including: a first filter, a second filter, and a third filter; a first power amplifier and a second power amplifier; and a first switch connected between the first filter, the second filter, and the third filter and the first power amplifier and the second power amplifier; wherein, when one of the LTE signal and the NR signal is amplified with the first power amplifier, the other of the LTE signal and the NR signal is amplified with the second power amplifier; and the first switch enables connection between the first filter and the first power amplifier, enables connection between the third filter and the second power amplifier, and enables selective connection between the second filter and one of the first power amplifier and the second power amplifier.

18 Claims, 11 Drawing Sheets

(56) References Cited

U.S. PATENT DOCUMENTS

| | | | | |
|---|---|---|---|---|
| 2020/0186185 | A1* | 6/2020 | Sakurai ................ | H04B 1/0057 |
| 2021/0013909 | A1 | 1/2021 | Ono et al. | |
| 2023/0299798 | A1* | 9/2023 | Zhang .................. | H04B 1/0064 455/552.1 |

FOREIGN PATENT DOCUMENTS

| | | | |
|---|---|---|---|
| JP | 2021-016052 | A | 2/2021 |
| WO | 2019/059085 | A1 | 3/2019 |

* cited by examiner

RADIO FREQUENCY CIRCUIT AND COMMUNICATION DEVICE

CROSS REFERENCE TO RELATED APPLICATION

This is a continuation application of PCT International Application No. PCT/JP2022/033120 filed on Sep. 2, 2022, designating the United States of America, which is based on and claims priority of Japanese Patent Application No. 2021-147530 filed on Sep. 10, 2021. The entire disclosures of the above-identified applications, including the specifications, drawings and claims are incorporated herein by reference in their entirety.

TECHNICAL FIELD

The present disclosure relates to a radio frequency circuit and a communication device.

BACKGROUND

3GPP (registered trademark) (3rd Generation Partnership Project) requires, for example, simultaneous transmission of 5G (5th generation)-NR (New Radio) first-band radio frequency signals and 4G (4th generation)-LTE (Long term Evolution) second-band radio frequency signals (ENDC: Eutra NR Dual Connectivity). PTL 1 discloses the configuration of a radio frequency circuit capable of simultaneously executing transmission of 4G-LTE transmission signals using a first transmission circuit and transmission of 5G-NR transmission signals using a second transmission circuit (ENDC).

CITATION LIST

Patent Literature

PTL 1: U.S. Unexamined Patent Application Publication No. 2021/0013909

SUMMARY

Technical Problems

However, in the radio frequency circuit disclosed in PTL 1, it is necessary to add filters to both the first transmission circuit and the second transmission circuit in order to cope with an increase in a band combination executing ENDC, and the circuit becomes large.

Accordingly, the present invention provides a compact radio frequency circuit capable of executing ENDC and a communication device.

Solutions

To achieve the aforementioned object, a radio frequency circuit according to one aspect of the present invention is a radio frequency circuit capable of simultaneously transmitting an LTE signal and an NR signal, the circuit including: a first filter, a second filter, and a third filter; a first power amplifier and a second power amplifier; and a first switch connected between the first filter, the second filter, and the third filter and the first power amplifier and the second power amplifier; wherein, when one of the LTE signal and the NR signal is amplified with the first power amplifier, an other of the LTE signal and the NR signal is amplified with the second power amplifier; and the first switch enables connection between the first filter and the first power amplifier, enables connection between the third filter and the second power amplifier, and enables selective connection between the second filter and one of the first power amplifier and the second power amplifier.

Advantageous Effects

According to the present invention, a compact radio frequency circuit capable of executing ENDC and a communication device can be provided.

BRIEF DESCRIPTION OF DRAWINGS

These and other advantages and features will become apparent from the following description thereof taken in conjunction with the accompanying Drawings, by way of non-limiting examples of embodiments disclosed herein.

DESCRIPTION OF EMBODIMENTS

Figure 1:
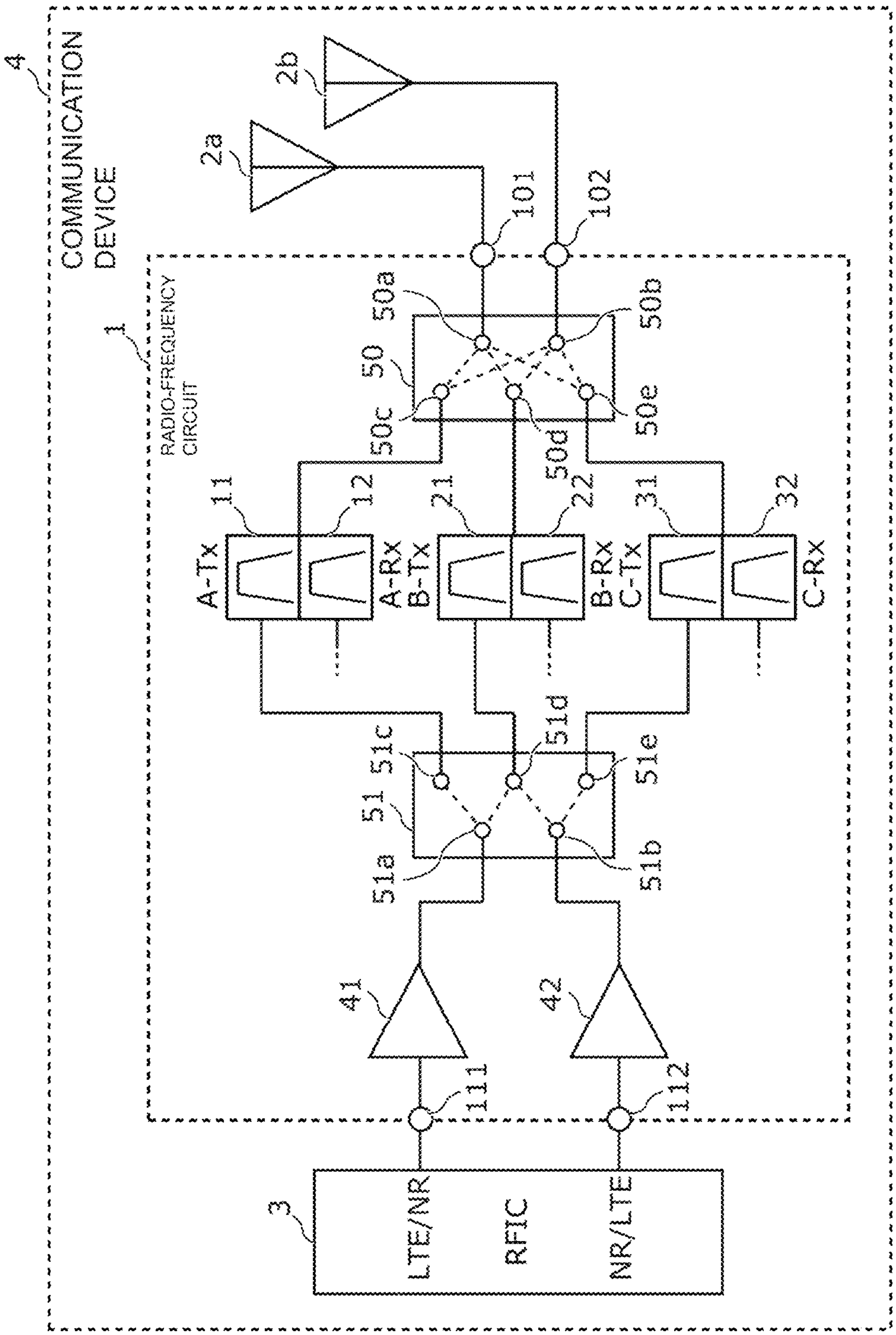
FIG. 1 is a circuit configuration diagram of a radio frequency circuit and a communication device according to an embodiment.

Hereinafter, embodiments of the present invention will be described in detail. Note that the embodiments described below are all illustrative of comprehensive or specific examples. The numerical values, shapes, materials, components, disposition and connection forms of the components, etc. described in the following embodiments are examples and are not intended to limit the present invention. Of the components in the following embodiments and modifications, those not set forth in the independent claims will be described as arbitrary components. Also, the sizes or the size ratios of the components depicted in the drawings are not necessarily exact. In the drawings, substantially identical configurations are denoted by the same reference numerals, and overlapping descriptions may be omitted or simplified.

Moreover, hereinafter, it is meant that terms indicating the relationships between elements, such as parallel and vertical, terms indicating the shapes of elements, such as rectangles, and numerical ranges do not only represent the strict meanings, but also encompass substantially equivalent ranges, such as a few percent difference.

In the circuit configuration of the present invention, "connected" includes not only cases where elements are directly connected with connection terminals and/or wiring conductors, but also cases where elements are electrically connected with other circuit elements interposed therebetween. "Connected between A and B" refers to being connected to both A and B between A and B, and includes, in addition to being connected in series to a path connecting A and B, being connected in parallel between the path and the ground (shunt connection).

Furthermore, in the component disposition of the present invention, "the component is disposed on the substrate" includes that the component is disposed on the main surface of the substrate, as well as that the component is disposed within the substrate. "The component is disposed on the main surface of the substrate" includes, in addition to that the component is disposed in contact with the main surface of the substrate, that the component is disposed above the main surface without being in contact with the main surface (e.g., that the component is stacked on another component disposed in contact with the main surface). Also, "the component is disposed on the main surface of the substrate" may include that the component is disposed in a recess formed in the main surface. "The component is disposed within the substrate" includes, in addition to that the component is encapsulated within a module substrate, that the entirety of the component is disposed between the two main surfaces of the substrate, but a portion of the component is not covered by the substrate, and that only a portion of the component is disposed within the substrate.

Also, in the present disclosure, "signal path" refers to a transmission line composed of wiring through which radio frequency signals propagate, an electrode directly connected to the wiring, and a terminal directly connected to the wiring or the electrode.

Embodiment

1 Circuit Configuration of Radio Frequency Circuit 1 and Communication Device 4

The circuit configuration of a radio frequency circuit 1 according to the present embodiment and a communication device 4 including the same will be described with reference to FIG. 1. FIG. 1 is a circuit configuration diagram of the radio frequency circuit 1 and the communication device 4 according to the present embodiment.

[1.1 Circuit Configuration of Communication Device 4]

The communication device 4 corresponds to a so-called user terminal (UE: User Equipment) and is typically a cell phone, a smartphone, a tablet computer, or the like. The communication device 4 as above includes the radio frequency circuit 1, antennas 2*a* and 2*b*, and an RFIC (Radio Frequency Integrated Circuit) 3.

The radio frequency circuit 1 transmits radio frequency signals between the antennas 2*a* and 2*b* and the RFIC 3. The internal configuration of the radio frequency circuit 1 will be described later.

The antenna 2*a* is connected to an antenna connection terminal 101 of the radio frequency circuit 1, and the antenna 2*b* is connected to an antenna connection terminal 102 of the radio frequency circuit 1. The antennas 2*a* and 2*b* receive radio frequency signals from the radio frequency circuit 1 and output them to the outside.

The RFIC 3 is an example of a signal processing circuit that processes radio frequency signals. Specifically, the RFIC 3 performs signal processing of transmission signals input from a BBIC (Baseband Integrated Circuit: not illustrated) by upconverting them, for example, and outputs radio frequency transmission signals generated by the signal processing to a transmission path of the radio frequency circuit 1. The RFIC 3 has two terminals that output LTE transmission signals (hereinafter referred to as LT signals) and NR transmission signals (hereinafter referred to as NR signals). One of the two terminals is connected to a radio frequency input terminal 111 of the radio frequency circuit 1, and the other of the two terminals is connected to a radio frequency input terminal 112 of the radio frequency circuit 1. At the same time as outputting one of the LTE signals and the NR signals from one terminal described above, the other of the LTE signals and the NR signals can be output from the other terminal described above.

In addition, the RFIC 3 has a control unit that controls switch circuits, amplifier circuits, etc. that the radio frequency circuit 1 has. Note that some or all of the functions as the control unit of the RFIC 3 may be configured outside of the RFIC 3, for example, in the BBIC or the radio frequency circuit 1.

Note that, in the communication device 4 according to the present embodiment, the antennas 2*a* and 2*b* are not essential components. Also, it is acceptable for there to be only one antenna.

[1.2 Circuit Configuration of Radio frequency Circuit 1]

Next, the circuit configuration of the radio frequency circuit 1 will be described. As illustrated in FIG. 1, the radio frequency circuit 1 includes filters 11, 12, 21, 22, 31, and 32, power amplifiers 41 and 42, switches 50 and 51, the antenna connection terminals 101 and 102, and the radio frequency input terminals 111 and 112.

The antenna connection terminal 101 is connected to the antenna 2*a*. The antenna connection terminal 102 is connected to the antenna 2*b*. The radio frequency input terminal 111 is a terminal for receiving LTE signals and NR signals from the outside of the radio frequency circuit 1 (RFIC 3). The radio frequency input terminal 112 is a terminal for receiving LTE signals and NR signals from the outside of the radio frequency circuit 1 (RFIC 3).

The filter 11 is an example of a first filter and has a passband including an uplink operating band of band A for FDD. The filter 11 is connected between the switch 51 and the switch 50.

The filter 12 is an example of a fourth filter and has a passband including a downlink operating band of band A for FDD. The filter 12 is connected to the switch 50. The filter 12, together with the filter 11, constitutes a duplexer for band A.

The filter 21 is an example of a second filter and has a passband including an uplink operating band of band B for FDD. The filter 21 is connected between the switch 51 and the switch 50.

The filter 22 has a passband including a downlink operating band of band B for FDD. The filter 22 is connected to the switch 50. The filter 22, together with the filter 21, constitutes a duplexer for band B.

The filter 31 is an example of a third filter and has a passband including an uplink operating band of band C for FDD. The filter 31 is connected between the switch 51 and the switch 50.

The filter 32 has a passband including a downlink operating band of band C for FDD. The filter 32 is connected to the switch 50. The filter 32, together with the filter 31, constitutes a duplexer for band C.

The power amplifier 41 is an example of a first power amplifier and is capable of amplifying transmission signals of band A and band B input from the radio frequency input terminal 111. The power amplifier 41 is connected between the radio frequency input terminal 111 and the switch 51.

The power amplifier 42 is an example of a second power amplifier and is capable of amplifying transmission signals of band B and band C input from the radio frequency input terminal 112. The power amplifier 42 is connected between the radio frequency input terminal 112 and the switch 51.

Band A, band B, and band C are frequency bands for communication systems built using radio access technology (RAT) predefined by standardization organizations (e.g., 3GPP (registered trademark) and IEEE (Institute of Electrical and Electronics Engineers)). As the communication systems, it is possible to use, for example, 5G-NR system, LTE system, and WLAN (Wireless Local Area Network) system, but the communication systems that can be used are not limited to these systems.

Band A, band B, and band C are each composed of a downlink operating band and an uplink operating band.

Note that the uplink operating band refers to the frequency range designated for uplink use within each of the bands described above. Furthermore, the downlink operating band refers to the frequency range designated for downlink use within each of the bands described above.

The switch 51 is an example of a first switch and is connected between the filters 11, 21, and 31 and the power amplifiers 41 and 42. Specifically, the switch 51 has a common terminal 51*a* (first common terminal), a common terminal 51*b* (second common terminal), a selection terminal 51*c* (first selection terminal), a selection terminal 51*d* (second selection terminal), and a selection terminal 51*e* (third selection terminal). The switch 51 selectively switches the connection between the common terminal 51*a* and the selection terminal 51*c* and the connection between the common terminal 51*a* and the selection terminal 51*d*, and selectively switches the connection between the common terminal 51*b* and the selection terminal 51*d* and the connection between the common terminal 51*b* and the selection terminal 51*e*. In addition, the common terminal 51*a* and the selection terminal 51*e* are not connected, and the common terminal 51*b* and the selection terminal 51*c* are not connected.

The common terminal 51*a* is connected to the output terminal of the power amplifier 41, and the common terminal 51*b* is connected to the output terminal of the power amplifier 42. Also, the selection terminal 51*c* is connected to the input end of the filter 11, the selection terminal 51*d* is connected to the input end of the filter 21, and the selection terminal 51*e* is connected to the input end of the filter 31. With this connection configuration, based on a control signal from the RFIC 3, for example, the switch 51 enables connection between the filter 11 and the power amplifier 41, enables connection between the filter 31 and the power amplifier 42, and enables selective connection between the filter 21 and one of the power amplifiers 41 and 42.

The switch 50 is an example of an antenna switch and is connected between the antenna connection terminals 101 and 102 and the filters 11, 12, 21, 22, 31, and 32. Specifically, the switch 50 has common terminals 50*a* and 50*b* and selection terminals 50*c*, 50*d*, and 50*e*. The switch 50 switches the connection between the common terminal 50*a* and the selection terminals 50*c*, 50*d*, and 50*e*, and switches the connection between the common terminal 50*b* and the selection terminals 50*c*, 50*d*, and 50*e*. Note that the switch 50 can enable simultaneous connection between the common terminal 50*a* and two or more of the selection terminals 50*c*, 50*d*, and 50*e*, and can enable simultaneous connection between the common terminal 50*b* and two or more of the selection terminals 50*c*, 50*d*, and 50*e*.

The common terminal 50*a* is connected to the antenna connection terminal 101, and the common terminal 50*b* is connected to the antenna connection terminal 102. The selection terminal 50*c* is connected to the output end of the filter 11 and the input end of the filter 12, the selection terminal 50*d* is connected to the output end of the filter 21 and the input end of the filter 22, and the selection terminal 50*e* is connected to the output end of the filter 31 and the input end of the filter 32. With this connection configuration, based on a control signal from the RFIC 3, for example, the switch 50 switches the connection between the antenna connection terminal 101 and the filters 11 and 12, the connection between the antenna connection terminal 101 and the filters 21 and 22, and the connection between the antenna connection terminal 101 and the filters 31 and 32, and switches the connection between the antenna connection terminal 102 and the filters 11 and 12, the connection between the antenna connection terminal 102 and the filters 21 and 22, and the connection between the antenna connection terminal 102 and the filters 31 and 32.

In the above-described circuit configuration, when one of the LTE signals and the NR signals are amplified with the power amplifier 41, the other of the LTE signals and the NR signals are amplified with the power amplifier 42. That is, the radio frequency circuit 1 can transmit the LTE signals and the NR signals simultaneously.

Specifically, the LTE signals of band A and the NR signals of band B can be transmitted simultaneously with the filters 11 and 21, respectively; the LTE signals of band A and the NR signals of band C can be transmitted simultaneously with the filters 11 and 31, respectively; and the LTE signals of band B and the NR signals of band C can be transmitted simultaneously with the filters 21 and 31, respectively. Also, the NR signals of band A and the LTE signals of band B can be transmitted simultaneously with the filters 11 and 21, respectively; the NR signals of band A and the LTE signals of band C can be transmitted simultaneously with the filters 11 and 31, respectively; and the NR signals of band B and the LTE signals of band C can be transmitted simultaneously with the filters 21 and 31, respectively.

A first example of a conventional radio frequency circuit has a first transmission circuit for transmitting NR signals and a second transmission circuit for transmitting LTE signals, and it has been necessary to dispose the filters 11, 21, and 31 in each of the first transmission circuit and the second transmission circuit in order to execute ENDC. Moreover, a second example of a conventional radio frequency circuit has a first transmission circuit and a second transmission circuit capable of transmitting both NR signals and LTE signals in order to execute ENDC, and it has been necessary to dispose at least the filters 11 and 21 in the first transmission circuit and at least the filters 21 and 31 in the second transmission circuit.

In contrast, the radio frequency circuit 1 according to the present embodiment is configured with, in order to execute ENDC, one transmission circuit including the filters 11, 21, and 31 by having the switch 51. Compared with the first example and the second example of the conventional radio frequency circuits, ENDC of two bands among band A, band B, and band C can be realized with a small number of filters, so that the compact radio frequency circuit 1 capable of executing ENDC can be provided.

Note that it is acceptable for some of the circuit elements depicted in FIG. 1 not to be included in the radio frequency circuit 1. For example, it is only necessary for the radio frequency circuit 1 to be provided with at least the power amplifiers 41 and 42, the filters 11, 21, and 31, and the switch 51, and the radio frequency circuit 1 need not be provided with other circuit elements.

[1.3 Circuit Configuration of Radio frequency Circuit 1A According to First Modification]

Figure 2:
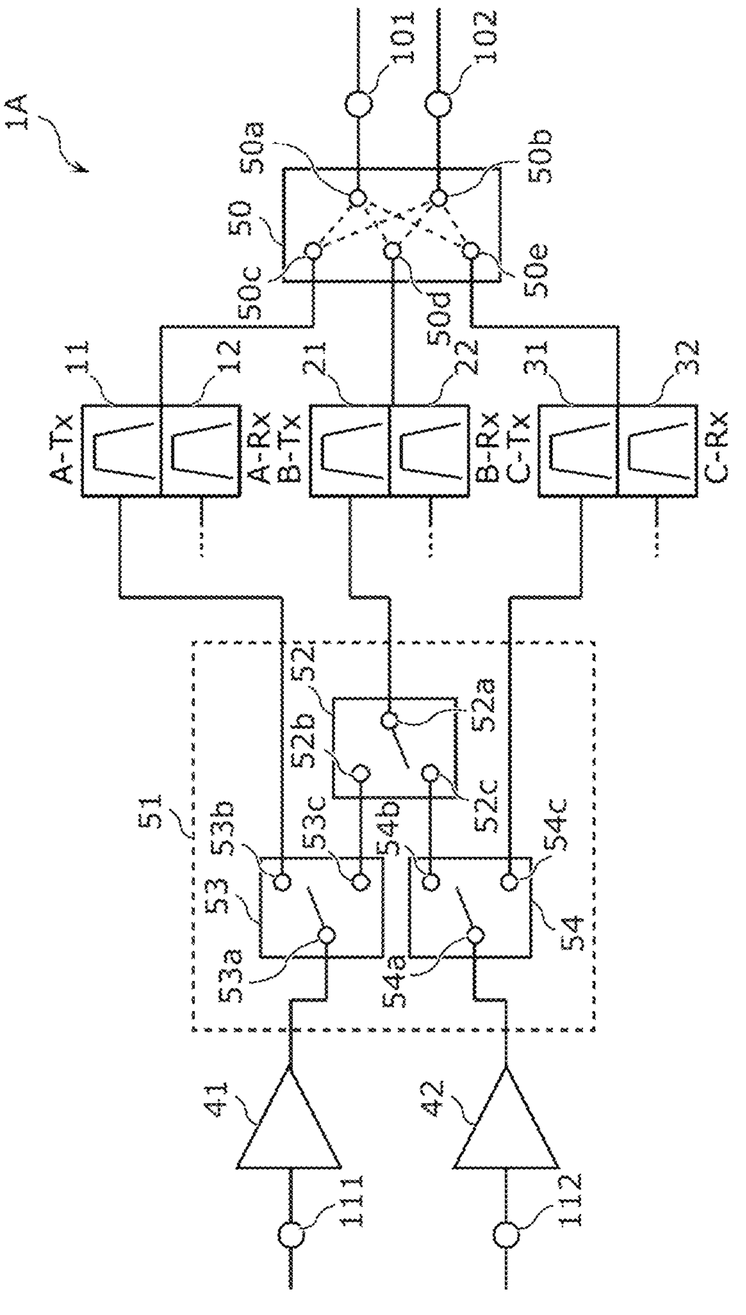
FIG. 2 is a circuit configuration diagram of a radio frequency circuit according to a first modification of the embodiment.

FIG. 2 is a circuit configuration diagram of a radio frequency circuit 1A according to a first modification of the embodiment. The radio frequency circuit 1A according to the present modification differs from the radio frequency circuit 1 according to the embodiment only in the configuration of the switch 51. Therefore, regarding the radio frequency circuit 1A according to the present modification, explanations of the same points as the radio frequency circuit 1 according to the embodiment will be omitted, and only the configuration of the switch 51 will be explained.

The switch 51 according to the present modification is composed of three switches 52, 53, and 54. The switches 52, 53, and 54 are each composed of an SPDT (Single Pole Double Throw) type switch circuit.

The switch 52 has a common terminal 52*a*, and selection terminals 52*b* and 52*c*, and selectively switches the connection between the common terminal 52*a* and the selection terminal 52*b*, and the connection between the common terminal 52*a* and the selection terminal 52*c*. The switch 53 has a common terminal 53*a*, and selection terminals 53*b* and 53*c*, and selectively switches the connection between the common terminal 53*a* and the selection terminal 53*b*, and the connection between the common terminal 53*a* and the selection terminal 53*c*. The switch 54 has a common terminal 54*a*, and selection terminals 54*b* and 54*c*, and selectively switches the connection between the common terminal 54*a* and the selection terminal 54*b*, and the connection between the common terminal 54*a* and the selection terminal 54*c*.

The common terminal 52*a* is connected to the input end of the filter 21, the selection terminal 52*b* is connected to the selection terminal 53*c*, the selection terminal 52*c* is connected to the selection terminal 54*b*, the common terminal 53*a* is connected to the output terminal of the power amplifier 41, the selection terminal 53*b* is connected to the input end of the filter 11, the common terminal 54*a* is connected to the output terminal of the power amplifier 42, and the selection terminal 54*c* is connected to the input end of the filter 31.

According to the above-described configuration of the switches 52, 53, and 54, the filter 11 and the power amplifier 41 become connectable, the filter 31 and the power amplifier 42 become connectable, and the filter 21 and one of the power amplifiers 41 and 42 become selectively connectable. In addition, the filter 31 and the power amplifier 41 become unconnectable, and the filter 11 and the power amplifier 42 become unconnectable.

Note that the switches 52, 53, and 54 may be formed in or on a semiconductor IC (Integrated Circuit). The semiconductor IC is composed of, for example, CMOS (Complementary Metal Oxide Semiconductor). Specifically, it is formed by an SOI (Silicon On Insulator) process. This makes it possible to manufacture semiconductor ICs inexpensively. Note that the semiconductor IC may be composed of at least any of GaAs, SiGe, and GaN. This makes it possible to output radio frequency signals with high-quality amplification performance and noise performance.

[1.4 Band Application Examples]

Figure 3:
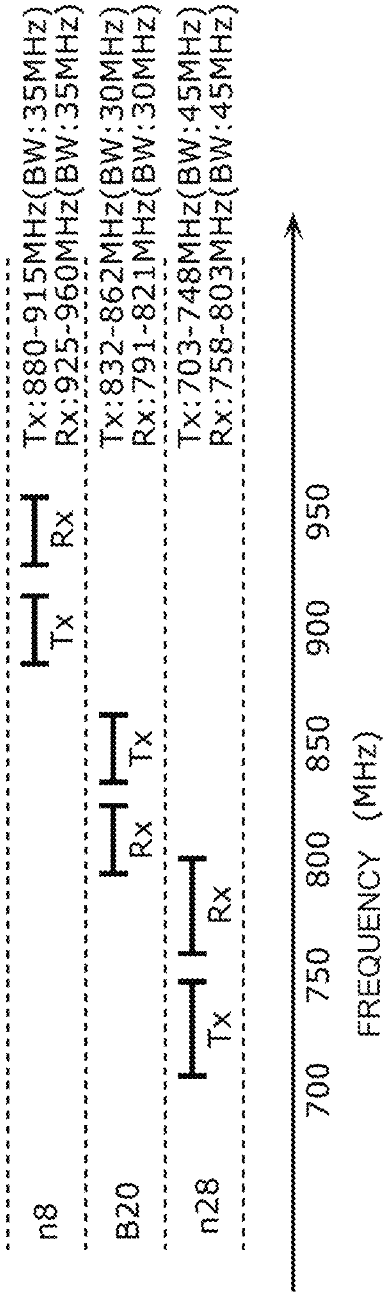
FIG. 3 is a diagram illustrating the frequency relationship of bands applied to the radio frequency circuit according to the embodiment.

FIG. 3 is a diagram illustrating the frequency relationship of bands applied to the radio frequency circuit 1 according to the embodiment. The following is an example of a combination of bands applied to the radio frequency circuit 1: band B8 for 4G-LTE (or band n8 for 5G-NR: uplink operating band 880-915 MHz, downlink operating band 925-960 MHz) is applied as the first band; band B20 for 4G-LTE (or band n20 for 5G-NR: uplink operating band 832-862 MHz, downlink operating band 791-821 MHz) is applied as the second band; and band B28 for 4G-LTE (or band n28 for 5G-NR: uplink operating band 703-748 MHz, downlink operating band 753-803 MHz) is applied as the third band.

Figure 4:
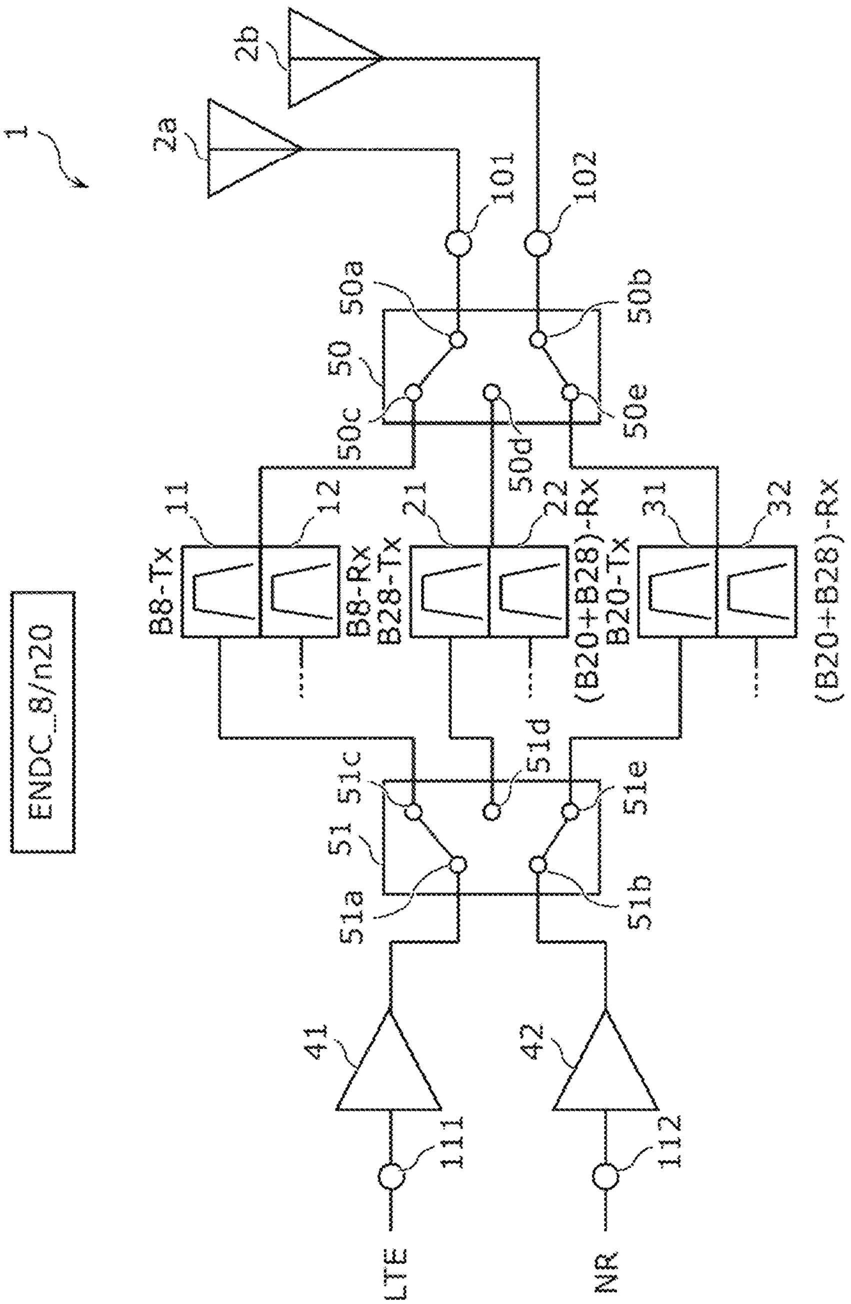
FIG. 4 is a diagram illustrating a first band application example of the radio frequency circuit according to the embodiment.

FIG. 4 is a diagram illustrating a first band application example of the radio frequency circuit 1 according to the embodiment. In the radio frequency circuit 1 illustrated in the diagram, band B8 for 4G-LTE (or band n8 for 5G-NR) (first band: first uplink operating band, first downlink operating band) is applied as band A; band B28 for 4G-LTE (or band n28 for 5G-NR) (third band: third uplink operating band, third downlink operating band) is applied as band B; and band B20 for 4G-LTE (or band n20 for 5G-NR) (second band: second uplink operating band, second downlink operating band) is applied as band C.

As illustrated in FIG. 3, the following bands are positioned in the following order, from the low frequency side: the third uplink operating band of band B28, the third downlink operating band of band B28, the second downlink operating band of band B20, the second uplink operating band of band B20, the first uplink operating band of band B8, and the first downlink operating band of band B8.

The filter 11 has a passband including the first uplink operating band of band B8, the filter 21 has a passband including the third uplink operating band of band B28, and the filter 31 has a passband including the second uplink operating band of band B20.

Accordingly, since band B20 (band B) and band B8 (Band A) are in frequency order of the second downlink operating band, the second uplink operating band, the first uplink operating band, and the first downlink operating band, it is anticipated that the frequencies of unwanted signals from third-order intermodulation distortion between the transmission signals of band B20 and the transmission signals of band B8 will be included in the reception band of band B20 or band B8 (the first downlink operating band or the second downlink operating band). In the meantime, the switch 51 is configured so as to disable connection between the common terminal 51*a* and the selection terminal 51*e*, and to disable connection between the common terminal 51*b* and the selection terminal 51*c*. Therefore, by using the filter 11 as a transmission filter of band B8 and the filter 31 as a transmission filter of band B20, high isolation is ensured between the filter 11 and the power amplifier 41 and between the filter 31 and the power amplifier 42, and thus the above-mentioned third-order intermodulation distortion can be suppressed.

For example, as illustrated in FIG. 4, in the case of executing ENDC of LTE band B8 and NR band n20, the common terminal 51*a* and the selection terminal 51*c* are connected, and the common terminal 51*b* and the selection terminal 51*e* are connected. Also, the common terminal 50*a* and the selection terminal 50*c* are connected, and the common terminal 50*b* and the selection terminal 50*e* are connected. Accordingly, the LTE signals of band B8 are output to the antenna 2*a* via the radio frequency input terminal 111, the power amplifier 41, the common terminal 51*a*, the selection terminal 51*c*, the filter 11, the switch 50, and the antenna connection terminal 101. Moreover, the NR signals of band n20 are output to the antenna 2*b* via the radio frequency input terminal 112, the power amplifier 42, the common terminal 51*b*, the selection terminal 51*e*, the filter 31, the switch 50, and the antenna connection terminal 102. At this time, high isolation can be ensured between the signal path connecting the common terminal 51*a* and the selection terminal 51*c* and the signal path connecting the common terminal 51*b* and the selection terminal 51*e*.

Note that, since the second downlink operating band of band B20 and the third downlink operating band of band E28 partially overlap in frequencies, the filter 22 may have a passband including the second downlink operating band of band B20 and the third downlink operating band of band B28. Similarly, the filter 32 may have a passband including the second downlink operating band of band B20 and the third downlink operating band of band B28.

Figure 5:
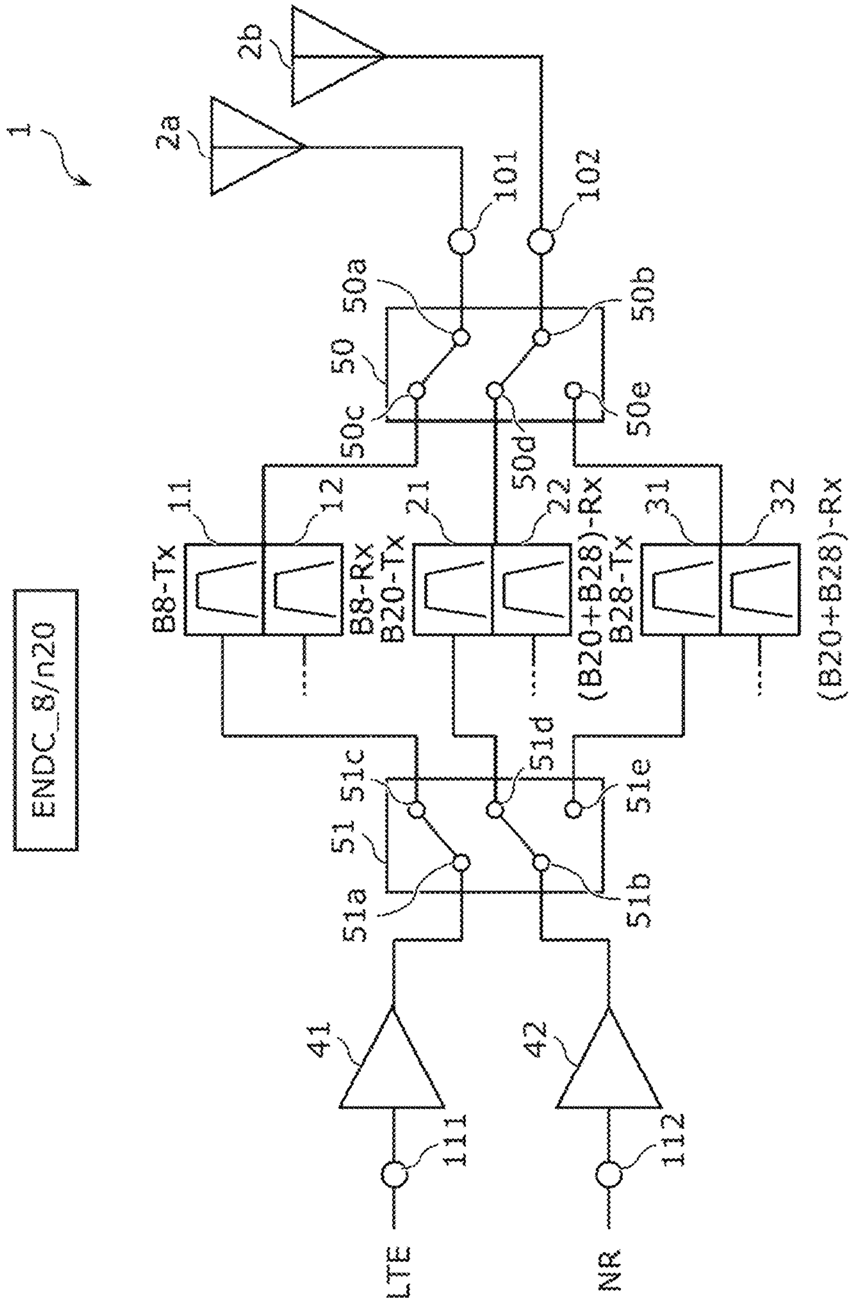
FIG. 5 is a diagram illustrating a second band application example of the radio frequency circuit according to the embodiment.

FIG. 5 is a diagram illustrating a second band application example of the radio frequency circuit 1 according to the embodiment. In the radio frequency circuit 1 illustrated in the diagram, band B8 for 4G-LTE (or band n8 for 5G-NR) (first band: first uplink operating band, first downlink operating band) is applied as band A; band B20 for 4G-LTE (or band n20 for 5G-NR) (second band: second uplink operating band, second downlink operating band) is applied as band B; and band B28 for 4G-LTE (or band n28 for 5G-NR) (third band: third uplink operating band, third downlink operating band) is applied as band C.

As illustrated in FIG. 3, the following bands are positioned in the following order, from the low frequency side: band B28, band B20, and band B8.

The filter 11 has a passband corresponding to band B8, and more specifically has a passband including the first uplink operating band of band B8. The filter 21 has a passband corresponding to band B20, and more specifically has a passband including the second uplink operating band of band B20. The filter 31 has a passband corresponding to band B28, and more specifically has a passband including the third uplink operating band of band B28.

Accordingly, since band B20 is a frequency band between band B28 and band B8, it is only necessary for the power amplifier 41 to have the amplification band of band B8 and band B20, and the power amplifier 42 to have the amplification band of band B20 and band B28. That is, the amplification band of each of the power amplifiers 41 and 42 can be made narrower. Thus, the performance of the power amplifiers 41 and 42 can be improved, and the signal quality of transmission signals transmitting through the radio frequency circuit 1 can be improved.

For example, as illustrated in FIG. 5, in the case of executing ENDC of LTE band B8 and NR band n20, the common terminal 51*a* and the selection terminal 51*c* are connected, and the common terminal 51*b* and the selection terminal 51*d* are connected. Also, the common terminal 50*a* and the selection terminal 50*c* are connected, and the common terminal 50*b* and the selection terminal 50*d* are connected. Accordingly, the LTE signals of band B8 are output to the antenna 2*a* via the radio frequency input terminal 111, the power amplifier 41, the common terminal 51*a*, the selection terminal 51*c*, the filter 11, the switch 50, and the antenna connection terminal 101. Moreover, the NR signals of band n20 are output to the antenna 2*b* via the radio frequency input terminal 112, the power amplifier 42, the common terminal 51*b*, the selection terminal 51*d*, the filter 21, the switch 50, and the antenna connection terminal 102.

Note that the radio frequency circuit 1 illustrated in FIG. 5 may include a filter (hereinafter referred to as a B5 filter) having a passband including the uplink operating band of band B5 for 4G-LTE (or band n5 for 5G-NR: uplink operating band 824-849 MHz, downlink operating band 869-894 MHz), and a filter (hereinafter referred to as a B18 filter) having a passband including the uplink operating band of band B18 for 4G-LTE (or band n18 for 5G-NR: uplink operating band 815-830 MHz, downlink operating band 860-875 MHz). In this case, the B5 filter and the B18 filter are disposed to be connected to the output terminal of the power amplifier 41 with the switch 51 interposed therebetween.

Accordingly, for example, it becomes possible to perform ENDC of LTE band B28 and NR band n5 as well as ENDC of LTE band B18 and NR band n28.

Note that the following is an example of a combination of bands applied to the radio frequency circuit 1 according to the present embodiment: band B5 for 4G-LTE (or band n5 for 5G-NR) is applied as the first band; band B13 for 4G-LTE (or band n13 for 5G-NR: uplink operating band 777-787 MHz, downlink operating band 746-756 MHz) is applied as the second band; and band B71 for 4G-LTE (or band n71 for 5G-NR: uplink operating band 663-698 MHz, downlink operating band 617-652 MHz) is applied as the third band.

Furthermore, the following is an example of a combination of bands applied to the radio frequency circuit 1 according to the present embodiment: band B71 for 4G-LTE (or band n71 for 5G-NR) is applied as the first band; band B12 for 4G-LTE (or band n12 for 5G-NR: uplink operating band 699-716 MHz, downlink operating band 729-746 MHz) is applied as the second band; and band B5 for 4G-LTE (or band n5 for 5G-NR) is applied as the third band.

Moreover, the following is an example of a combination of bands applied to the radio frequency circuit 1 according to the present embodiment: band B2 or band B25 for 4G-LTE, band n2 for 5G-NR (first uplink operating band 1850-1910 MHz, first downlink operating band 1930-1990 MHz), or band n25 for 5G-NR (first uplink operating band 1850-1915 MHz, first downlink operating band 1930-1995 MHz) is applied as the first band; band B66 for 4G-LTE or band n66 for 5G-NR (second uplink operating band 1710-1780 MHz, second downlink operating Band 2110-2200 MHz) is applied as the second band; and band B1 for 4G-LTE or band n1 for 5G-NR (third uplink operating band 1920-1980 MHz, third downlink operating band 2110-2170 MHz) is applied as the third band.

In this case, the following bands are positioned in the following order, from the low frequency side: the second uplink operating band of band B66 (n66), the first uplink operating band of band B2 (n2) or band B25 (n25), the first downlink operating band of band B2 (n2) or band B25 (n25), and the second downlink operating band of band B66 (n66).

The filter 11 has a passband including the first uplink operating band of band B2 (n2) or band B25 (n25), the filter 21 has a passband including the third uplink operating band of band B1 (n1), and the filter 31 has a passband including the second uplink operating band of band B66.

Accordingly, since band B2 (band B25) and band B66 are in frequency order of the second uplink operating band, the first uplink operating band, the first downlink operating band, and the second downlink operating band, it is anticipated that the frequencies of unwanted signals from third-order intermodulation distortion between the transmission signals of band B2 (B25) and the transmission signals of band B66 will be included in the transmission band (second uplink operating band), the reception band (second downlink operating band) of band B66, or the reception band (first downlink operating band) of band B2 (B25), More specifically, third-order intermodulation distortion (1710 MHz) that occurs in the transmission signals (1850 MHz) of band B2 (B25) and the transmission signals (1780 MHz) of band B66 is included in the second uplink operating band of band B66 (n66). Furthermore, third-order intermodulation distortion (1990 MHz) that occurs in the transmission signals (1850 MHz) of band B2 (1325) and the transmission signals (1710 MHz) of band B66 is included in the first uplink operating band of band B2 (n2) or band B25 (n25). Also, third-order intermodulation distortion (2110 MHz) that occurs in the transmission signals (1910 MHz) of band B2 (B25) and the transmission signals (1710 MHz) of band B66 is included in the second uplink operating band of band B66 (n66).

In the meantime, the switch 51 is configured so as to disable connection between the common terminal 51*a* and the selection terminal 51*e*, and to disable connection between the common terminal 51*b* and the selection terminal 51*c*. Therefore, by using the filter 11 as a transmission filter of band B2 (1325) and the filter 31 as a transmission filter of band B66, high isolation is ensured between the filter 11 and the power amplifier 41 and between the filter 31 and the power amplifier 42, and thus the above-mentioned third-order intermodulation distortion can be suppressed.

For example, in the case of executing ENDC of LTE band B2 (B25) and NR band n66, the common terminal 51*a* and the selection terminal 51*c* are connected, and the common terminal 51*b* and the selection terminal 51*e* are connected. Also, the common terminal 50*a* and the selection terminal 50*c* are connected, and the common terminal 50*b* and the selection terminal 50*e* are connected. Accordingly, the LTE signals of band B2 (1325) are output to the antenna 2*a* via the radio frequency input terminal 111, the power amplifier 41, the common terminal 51*a*, the selection terminal 51*c*, the filter 11, the switch 50, and the antenna connection terminal 101. Moreover, the NR signals of band n66 are output to the antenna 2*b* via the radio frequency input terminal 112, the power amplifier 42, the common terminal 51*b*, the selection terminal 51*e*, the filter 31, the switch 50, and the antenna connection terminal 102. At this time, high isolation can be ensured between the signal path connecting the common terminal 51*a* and the selection terminal 51*c* and the signal path connecting the common terminal 51*b* and the selection terminal 51*e*.

[1.5 Circuit Configuration of Radio frequency Circuit 1B According to Second Modification]

Figure 6:
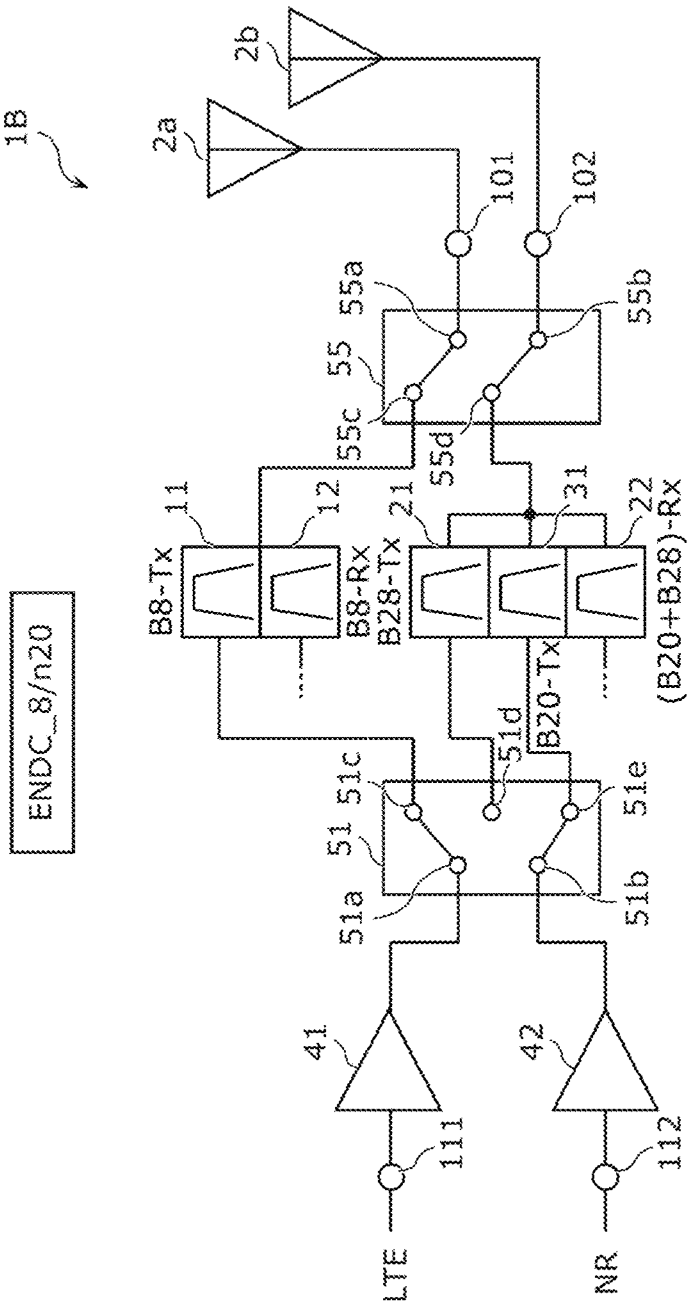
FIG. 6 is a circuit configuration diagram of a radio frequency circuit according to a second modification of the embodiment.

FIG. 6 is a circuit configuration diagram of a radio frequency circuit 1B according to a second modification of the embodiment. As illustrated in the diagram, the radio frequency circuit 1B includes filters 11, 12, 21, 22, and 31, power amplifiers 41 and 42, switches 51 and 55, antenna connection terminals 101 and 102, and radio frequency input terminals 111 and 112. The radio frequency circuit 1B according to the present modification differs from the radio frequency circuit 1 according to the embodiment in the point that there is no filter 32, and in the configuration of the switch 55. Hereinafter, regarding the radio frequency circuit 1B according to the present modification, explanations of the same points as the radio frequency circuit 1 according to the embodiment will be omitted, and the different configuration will be mainly explained.

The filter 22 is an example of a fifth filter, and, since it has a passband including the second downlink operating band of band B20 and the third downlink operating band of band B28, it can serve as a substitute for the filter 32 disposed in the radio frequency circuit 1.

The switch 55 is an example of an antenna switch and is connected between the antenna connection terminals 101 and 102 and the filters 11, 12, 21, 22, and 31. Specifically, the switch 55 has common terminals 55*a* and 55*b*, and selection terminals 55*c* and 55*d*. The switch 55 switches the connection and non-connection between the common terminal 55*a* and the selection terminal 55*c*, and switches the connection and non-connection between the common terminal 55*b* and the selection terminal 55*d*.

The common terminal 55*a* is connected to the antenna connection terminal 101, and the common terminal 55*b* is connected to the antenna connection terminal 102. The selection terminal 55*c* is connected to the output end of the filter 11 and the input end of the filter 12, and the selection terminal 55*d* is connected to the output end of the filter 21, the input end of the filter 22, and the output end of the filter 31.

Accordingly, the compact radio frequency circuit 1B capable of executing ENDC, in which the number of filters is further reduced, can be provided.

[1.6 Circuit Configuration of Radio frequency Circuit 1C According to Third Modification]

Figure 7:
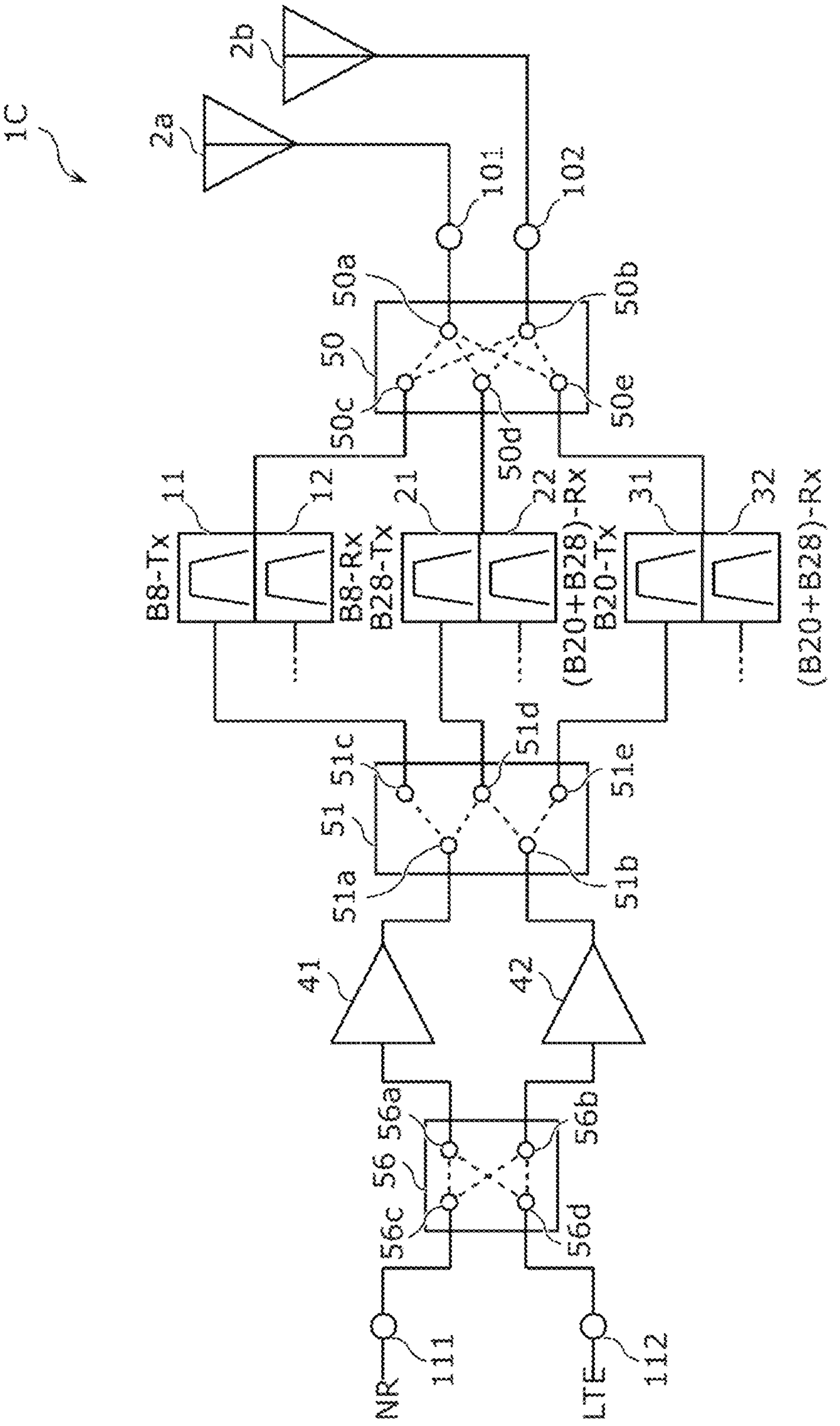
FIG. 7 is a circuit configuration diagram of a radio frequency circuit according to a third modification of the embodiment.

FIG. 7 is a circuit configuration diagram of a radio frequency circuit 1C according to a third modification of the embodiment. As illustrated in the diagram, the radio frequency circuit 1C includes filters 11, 12, 21, 22, 31, and 32, power amplifiers 41 and 42, switches 50, 51, and 56, antenna connection terminals 101 and 102, and radio frequency input terminals 111 and 112. The radio frequency circuit 1C according to the present modification differs from the radio frequency circuit 1 according to the embodiment in the point that the switch 56 has been added. Hereinafter, regarding the radio frequency circuit 1C according to the present modification, explanations of the same points as the radio frequency circuit 1 illustrated in FIG. 4 will be omitted, and the different configuration will be mainly explained.

The switch 56 is an example of a second switch and has a terminal 56*a* (first terminal), a terminal 56*b* (second terminal), a terminal 56*c* (third terminal), and a terminal 56*d* (fourth terminal). The switch 56 can switch between (1) a first connection state in which the terminal 56*a* and the terminal 56*c* are connected, and the terminal 56*b* and the terminal 56*d* are connected, and (2) a second connection state in which the terminal 56*a* and the terminal 56*d* are connected, and the terminal 56*b* and the terminal 56*c* are connected.

The terminal 56*a* is connected to the input terminal of the power amplifier 41, and the terminal 56*b* is connected to the input terminal of the power amplifier 42. NR signals are input to the terminal 56*c* via the radio frequency input terminal 111, and LTE signals are input to the terminal 56*d* via the radio frequency input terminal 112.

According to the above-described configuration, with the simplified switch 56, when one of the LTE signals and the NR signals are amplified with the power amplifier 41, the other of the LTE signals or the NR signals can be amplified with the power amplifier 42.

Figure 8A:
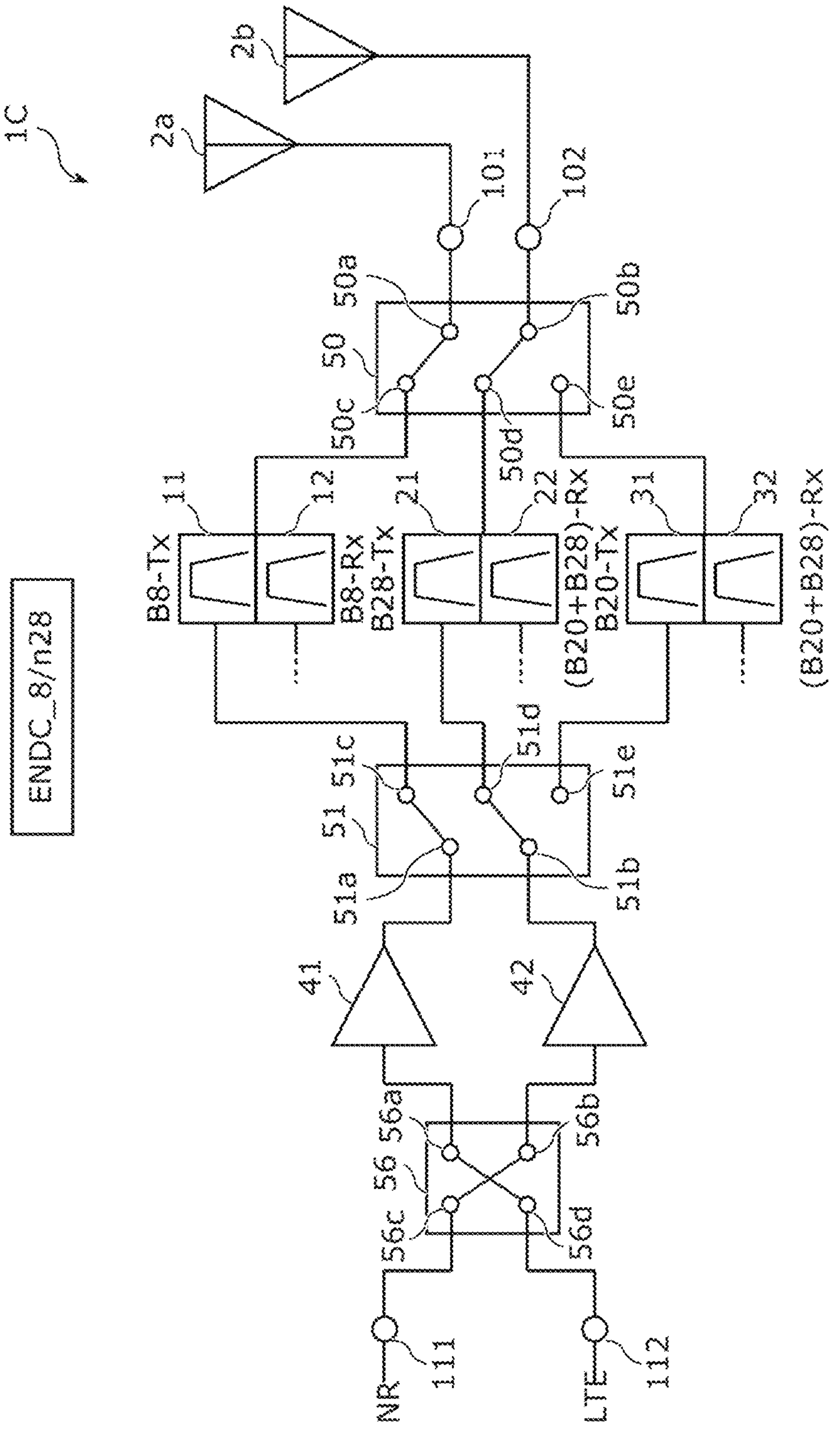
FIG. 8A is a circuit state diagram in the case where the radio frequency circuit according to the third modification of the embodiment executes first ENDC.

FIG. 8A is a circuit state diagram in the case where the radio frequency circuit 1C according to the third modification of the embodiment executes first ENDC. As illustrated in the diagram, in the case of executing ENDC of LTE band B8 and NR band n28, the terminal 56*a* and the terminal 56*d* are connected, and the terminal 56*b* and the terminal 56*c* are connected. Also, the common terminal 51*a* and the selection terminal 51*c* are connected, and the common terminal 51*b* and the selection terminal 51*d* are connected. Furthermore, the common terminal 50*a* and the selection terminal 50*c* are connected, and the common terminal 50*b* and the selection terminal 50*d* are connected. Accordingly, the LTE signals of band B8 are output to the antenna 2*a* via the radio frequency input terminal 112, the switch 56, the power amplifier 41, the switch 51, the filter 11, the switch 50, and the antenna connection terminal 101. Moreover, the NR signals of band n28 are output to the antenna 2*b* via the radio frequency input terminal 111, the switch 56, the power amplifier 42, the switch 51, the filter 21, the switch 50, and the antenna connection terminal 102.

Figure 8B:
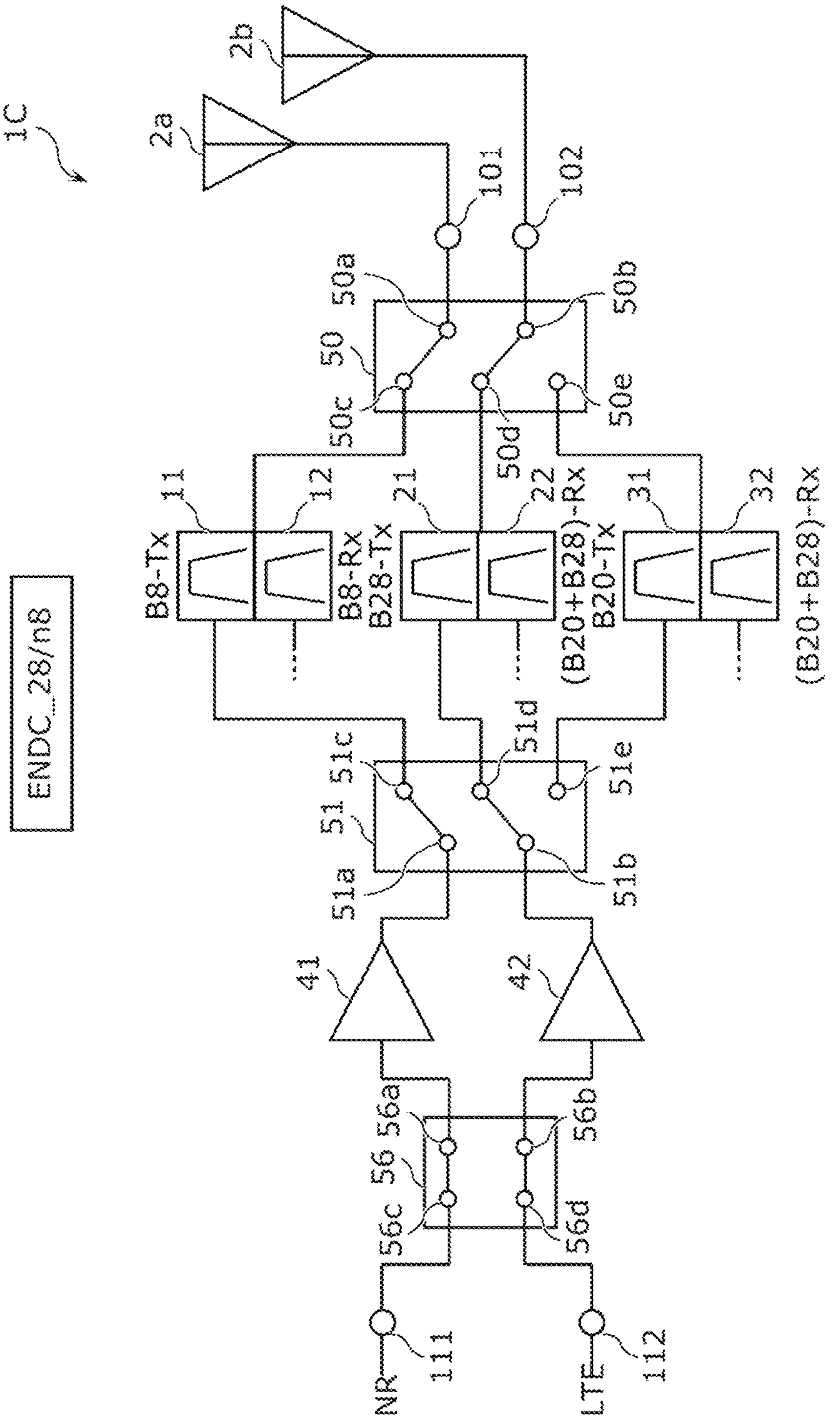
FIG. 8B is a circuit state diagram in the case where the radio frequency circuit according to the third modification of the embodiment executes second ENDC.

FIG. 8B is a circuit state diagram in the case where the radio frequency circuit 1C according to the third modification of the embodiment executes second ENDC. As illustrated in the diagram, in the case of executing ENDC of LTE band B28 and NR band n8, the terminal 56*a* and the terminal 56*c* are connected, and the terminal 56*b* and the terminal 56*d* are connected. Also, the common terminal 51*a* and the selection terminal 51*c* are connected, and the common terminal 51*b* and the selection terminal 51*d* are connected. Furthermore, the common terminal 50*a* and the selection terminal 50*c* are connected, and the common terminal 50*b* and the selection terminal 50*d* are connected. Accordingly, the LTE signals of band B28 are output to the antenna 2*b* via the radio frequency input terminal 112, the switch 56, the power amplifier 42, the switch 51, the filter 21, the switch 50, and the antenna connection terminal 102. Moreover, the NR signals of band n8 are output to the antenna 2*a* via the radio frequency input terminal 111, the switch 56, the power amplifier 41, the switch 51, the filter 11, the switch 50, and the antenna connection terminal 101.

Figure 8C:
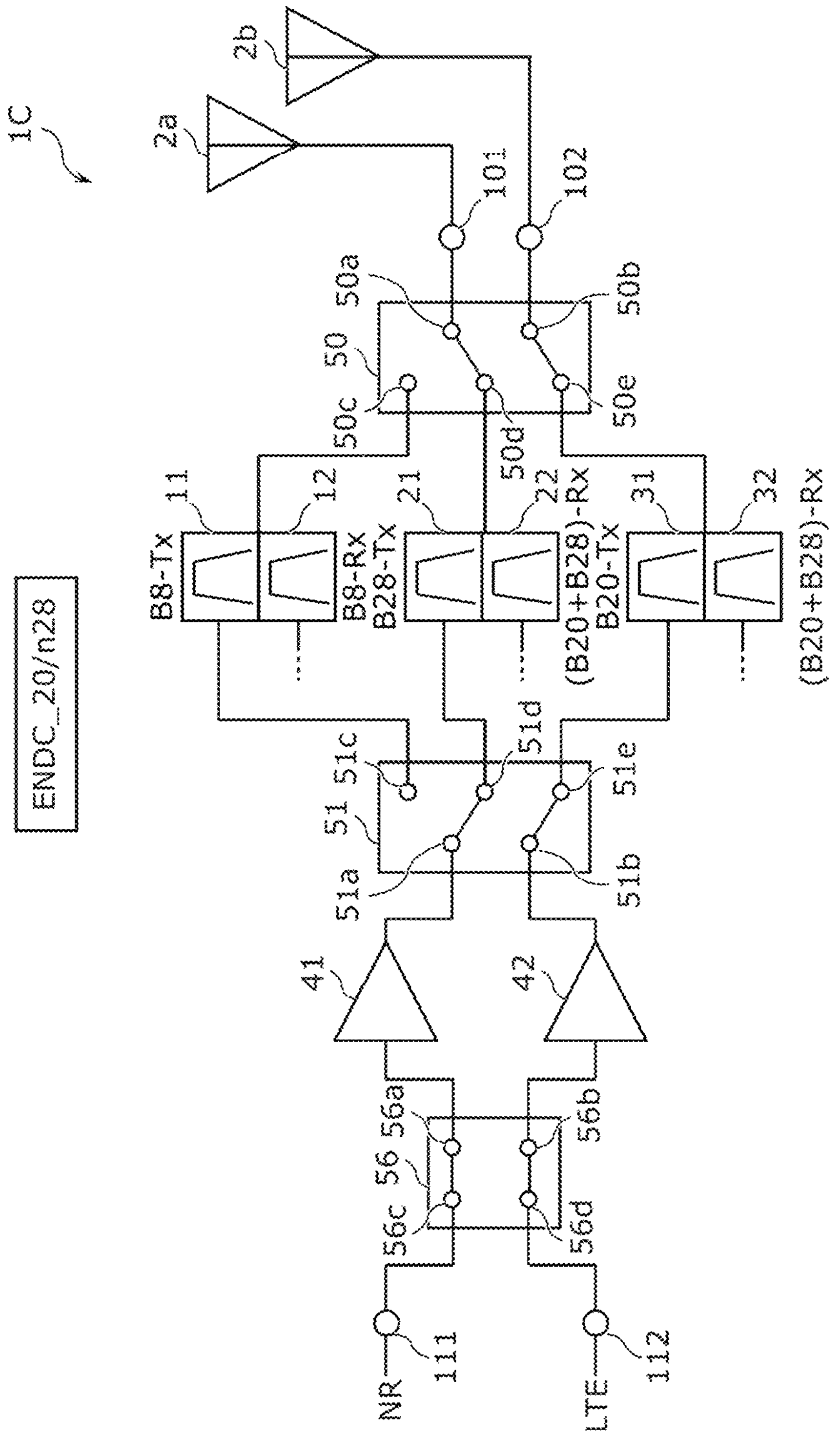
FIG. 8C is a circuit state diagram in the case where the radio frequency circuit according to the third modification of the embodiment executes third ENDC.

FIG. 8C is a circuit state diagram in the case where the radio frequency circuit 1C according to the third modification of the embodiment executes third ENDC. As illustrated in the diagram, in the case of executing ENDC of LTE band B20 and NR band n28, the terminal 56*a* and the terminal 56*c* are connected, and the terminal 56*b* and the terminal 56*d* are connected. Also, the common terminal 51*a* and the selection terminal 51*d* are connected, and the common terminal 51*b* and the selection terminal 51*e* are connected. Furthermore, the common terminal 50*a* and the selection terminal 50*d* are connected, and the common terminal 50*b* and the selection terminal 50*e* are connected. Accordingly, the LTE signals of band B20 are output to the antenna 2*b* via the radio frequency input terminal 112, the switch 56, the power amplifier 42, the switch 51, the filter 31, the switch 50, and the antenna connection terminal 102. Moreover, the NR signals of band n28 are output to the antenna 2*a* via the radio frequency input terminal 111, the switch 56, the power amplifier 41, the switch 51, the filter 21, the switch 50, and the antenna connection terminal 101.

In addition to the above, (1) ENDC of band LTE B28 and NR band n20, (2) ENDC of LTE band B8 and NR band n20, and (3) ENDC of LTE band B20 and NR band n8 can also be controlled by appropriately controlling the connections of the switches 50, 51, and 56.

Furthermore, in the radio frequency circuit 1 according to the present embodiment, it is possible to execute ENDC of two uplinks and three downlinks. For example, in the radio frequency circuit 1C according to the present modification, ENDC of two uplinks of LTE band B20 and NR band n28, and three downlinks of LTE band B8, LTE band B20, and NR band n28 can be executed. In this case, the terminal 56*a* and the terminal 56*c* are connected, and the terminal 56*b* and the terminal 56*d* are connected. Also, the common terminal 51*a* and the selection terminal 51*d* are connected, and the common terminal 51*b* and the selection terminal 51*e* are connected. Furthermore, the common terminal 50*a* and the selection terminal 50*d* are connected, the common terminal 50*a* and the selection terminal 50*c* are connected, and the common terminal 50*b* and the selection terminal 50*e* are connected. Accordingly, the LTE transmission signals of band B20 are output to the antenna 2*b* via the radio frequency input terminal 112, the switch 56, the power amplifier 42, the switch 51, the filter 31, the switch 50, and the antenna connection terminal 102. Moreover, the NR transmission signals of band n28 are output to the antenna 2*a* via the radio frequency input terminal 111, the switch 56, the power amplifier 41, the switch 51, the filter 21, the switch 50, and the antenna connection terminal 101. Furthermore, the LTE reception signals of band B8 are output to a receiving circuit (not illustrated) of band B8 via the antenna 2*a*, the antenna connection terminal 101, the switch 50, and the filter 12. In addition, the LTE reception signals of band B20 are output to a receiving circuit (not illustrated) of band B20 via the antenna 2*b*, the antenna connection terminal 102, the switch 50, and the filter 32. Moreover, the NR reception signals of band n28 are output to a receiving circuit (not illustrated) of band n28 via the antenna 2*a*, the antenna connection terminal 101, the switch 50, and the filter 22.

[1.7 Implementation Configuration of Radio Frequency Circuit 1]

Figure 9:
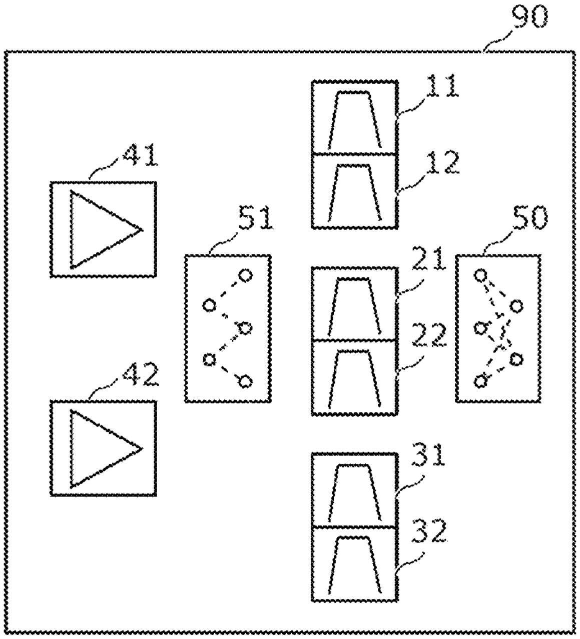
FIG. 9 is a diagram illustrating an example of an implementation configuration of the radio frequency circuit according to the embodiment.

FIG. 9 is a diagram illustrating an example of an implementation configuration of the radio frequency circuit 1 according to the embodiment. The diagram schematically illustrates an implementation configuration of the radio frequency circuit 1 disposed on a module substrate 90. Note that FIG. 9 illustrates a disposition diagram of circuit components in the case where the main surface of the module substrate 90 is viewed in plan. In addition, in FIG. 9, each circuit component is appended with a mark representing its function so that the disposition relationship of the circuit components can be easily understood, but the actual circuit components are not appended with their marks. Also, although not illustrated in FIG. 9, the wiring connecting the circuit components, illustrated in FIG. 1, is formed inside and on the main surface of the module substrate 90. The wiring may also be a bonding wire whose two ends are joined to the main surface and to any of the circuit components constituting the radio frequency circuit 1, or may be a terminal, an electrode, or wiring formed on the surface of the circuit component.

In FIG. 9, the module substrate 90 is capable of implementing electronic components, for example, on its main surface and internally. The module substrate 90 may be, for example, a low-temperature co-fired ceramics (LTCC) substrate with a multilayer structure of multiple dielectric layers, a high-temperature co-fired ceramics (HTCC) substrate, a substrate with embedded components, a substrate with a redistribution layer (RDL), or a printed circuit board.

As illustrated in FIG. 9, the filters 11, 12, 21, 22, 31, and 32, the power amplifiers 41 and 42, and the switches 50 and 51 are disposed in or on the module substrate 90.

Accordingly, ENDC of two bands among band A, band B, and band C can be realized with the compact radio frequency circuit 1.

It is also acceptable for the filter 21 and the filter 31 to be formed in or on the same chip. Note that the fact that the filter 21 and the filter 31 are formed in or on the same chip includes that the filter 21 and the filter 31 are disposed within the same package.

Also, the filter 21 and the filter 31 are acoustic wave filters, and they may be formed in or on the same piezoelectric substrate.

For example, since there is the second downlink operating band of band B20 between the second uplink operating band of band B20 and the third uplink operating band of band B28, unwanted waves from third-order intermodulation distortion generated by the transmission signals of band B20 and the transmission signals of band B28 are unlikely to occur in the third downlink operating band and the second downlink operating band. Therefore, by integrating the filter 21 and the filter 31 into a single chip, the radio frequency circuit 1 can be miniaturized without concerns about degradation of reception sensitivity due to unwanted waves from third-order intermodulation distortion.

2 Advantageous Effects, Etc.

As described above, the radio frequency circuit 1 according to the present embodiment is a radio frequency circuit capable of simultaneously transmitting an LTE signal and an NR signal, the circuit including: filters 11, 21, and 31; power amplifiers 41 and 42; and a switch 51 connected between the filters 11, 21, and 31 and the power amplifiers 41 and 42; wherein, when one of the LTE signal and the NR signal is amplified with the power amplifier 41, an other of the LTE signal and the NR signal is amplified with the power amplifier 42, and the switch 51 enables connection between the filter 11 and the power amplifier 41, enables connection between the filter 31 and the power amplifier 42, and enables selective connection between the filter 21 and one of the power amplifiers 41 and 42.

Accordingly, the radio frequency circuit 1, with one transmission circuit including the filters 11, 21, and 31, enables ENDC with a small number of filters compared to conventional radio frequency circuits. Thus, the compact radio frequency circuit 1 capable of executing ENDC can be provided.

Also, for example, in the radio frequency circuit 1, the switch 51 may have common terminals 51*a* and 51*b*, and selection terminals 51*c*, 51*d*, and 51*e*; the switch 51 may selectively switch connection between the common terminal 51*a* and the selection terminal 51*c* and connection between the common terminal 51*a* and the selection terminal 51*d*, and selectively switch connection between the common terminal 51*b* and the selection terminal 51*d* and connection between the common terminal 51*b* and the selection terminal 51*e*; the common terminal 51*a* may be connected to an output terminal of the power amplifier 41, the common terminal 51*b* may be connected to an output terminal of the power amplifier 42, the selection terminal 51*c* may be connected to an input end of the filter 11, the selection terminal 51*d* may be connected to an input end of the filter 21, and the selection terminal 51*e* may be connected to an input end of the filter 31.

Accordingly, ENDC is enabled using a simplified switch circuit.

Moreover, for example, in the radio frequency circuit 1, it is acceptable for the common terminal 51*a* and the selection terminal 51*e* not to be connected, and the common terminal 51*b* and the selection terminal 51*c* not to be connected.

Furthermore, for example, in the radio frequency circuit 1, regarding a first band for FDD composed of a first downlink operating band and a first uplink operating band, a second band for FDD composed of a second downlink operating band and a second uplink operating band, and a third band, following bands may be positioned in a following order, from a low frequency side or a high frequency side: the third band, the second downlink operating band, the second uplink operating band, the first uplink operating band, and the first downlink operating band; and the filter 11 may have a passband including the first uplink operating band, the filter 21 may have a passband corresponding to the third band, and the filter 31 may have a passband including the second uplink operating band.

Accordingly, since the first band and the second band are in frequency order of the first downlink operating band, the first uplink operating band, the second uplink operating band, and the second downlink operating band, the frequencies of third-order intermodulation distortion may overlap the first downlink operating band and the second downlink operating band. In response to this, by setting the passband of the filter 11 to the first uplink operating band and the passband of the filter 31 to the second uplink operating band, the switch 51 suppresses degradation of isolation between the filter 11 and the power amplifier 41 and between the filter 31 and the power amplifier 42, thereby suppressing degradation of the reception sensitivity due to third-order intermodulation distortion.

In addition, for example, in the radio frequency circuit 1, following bands may be positioned in a following order, from a low frequency side or a high frequency side: the third band, the second band, and the first band; and the filter 11 may have a passband corresponding to the first band, the filter 21 may have a passband corresponding to the second band, and the filter 31 may have a passband corresponding to the third band.

Accordingly, since the second band is a frequency band between the first band and the third band, the power amplifier 41 may have an amplification band of the first band and the second band, and the power amplifier 42 may have an amplification band of the second band and the third band. That is, the performance of the power amplifiers can be improved by narrowing the amplification bands of the power amplifiers 41 and 42. Thus, the signal quality of transmission signals transmitting through the radio frequency circuit 1 can be improved.

Also, for example, in the radio frequency circuit 1, the first band may be band B8 for 4G-LTE or band n8 for 5G-NR, the second band may be band B20 for 4G-LTE or band n20 for 5G-NR, and the third band may be band B28 for 4G-LTE or band n28 for 5G-NR.

Furthermore, for example, in the radio frequency circuit 113, the third band may be composed of a third downlink operating band and a third uplink operating band; the second downlink operating band and the third downlink operating band may partially overlap in frequencies; and the radio frequency circuit 1B may further include a filter 12 having a passband including the first downlink operating band and a filter 22 having a passband including the second downlink operating band and the third downlink operating band.

Accordingly, the compact radio frequency circuit 1B capable of executing ENDC, in which the number of filters is reduced, can be provided.

Also, for example, in the radio frequency circuit 1, the first band may be band B5 for 4G-LTE or band n5 for 5G-NR, the second band may be band B13 for 4G-LTE or band n13 for 5G-NR, and the third band may be band B71 for 4G-LTE or band n71 for 5G-NR.

Furthermore, for example, in the radio frequency circuit 1, the first band may be band B71 for 4G-LTE or band n71 for 5G-NR, the second band may be band B12 for 4G-LTE or band n12 for 5G-NR, and the third band may be band B5 for 4G-LTE or band n5 for 5G-NR.

Moreover, for example, in the radio frequency circuit 1, the filter 21 and the filter 31 may be formed in or on the same chip.

Since there is the second downlink operating band between the second uplink operating band and the third band, it is unlikely that unwanted signals from third-order intermodulation distortion will occur in the downlink operating band of the third band and the second downlink operating band. Thus, by integrating the filter 21 and the filter 31 into a single chip, miniaturization can be achieved without concerns about degradation of reception sensitivity due to third-order intermodulation distortion.

In addition, for example, in the radio frequency circuit 1, the filters 21 and 31 may be acoustic wave filters, and the filter 21 and the filter 31 may be formed in or on the same piezoelectric substrate.

Accordingly, miniaturization can be achieved without concerns about degradation of reception sensitivity due to third-order intermodulation distortion.

Furthermore, for example, in the radio frequency circuit 1, regarding a first band for frequency division duplex (FDD) composed of a first downlink operating band and a first uplink operating band, a second band for FDD composed of a second downlink operating band and a second uplink operating band, and a third band, following bands may be positioned in a following order, from a low frequency side or a high frequency side: the second uplink operating band, the first uplink operating band, the first downlink operating band, and the second downlink operating band; and the filter 11 may have a passband including the first uplink operating band, the filter 21 may have a passband corresponding to the third band, and the filter 31 may have a passband including the second uplink operating band.

Accordingly, since the first band and the second band are in frequency order of the second uplink operating band, the first uplink operating band, the first downlink operating band, and the second downlink operating band, the frequencies of third-order intermodulation distortion may overlap the second downlink operating band, the second uplink operating band, or the first downlink operating band. In response to this, by setting the passband of the filter 11 to the first uplink operating band and the passband of the filter 31 to the second uplink operating band, the switch 51 suppresses degradation of isolation between the filter 11 and the power amplifier 41 and between the filter 31 and the power amplifier 42, thereby suppressing third-order intermodulation distortion.

Also, for example, in the radio frequency circuit 1, the first band may be band B2 or band B25 for 4G-LTE, or band n2 or band n25 for 5G-NR, the second band may be band B66 for 4G-LTE or band n66 for 5G-NR, and the third band may be band B1 for 4G-LTE or band n1 for 5G-NR.

Furthermore, for example, the radio frequency circuit 1C may further include terminals 56*a*, 56*b*, 56*c*, and 56*d*, and a switch 56 capable of switching between a first connection state in which the terminal 56*a* and the terminal 56*c* are connected, and the terminal 56*b* and the terminal 56*d* are connected, and a second connection state in which the terminal 56*a* and the terminal 56*d* are connected, and the terminal 56*b* and the terminal 56*c* are connected; the terminal 56*a* may be connected to an input terminal of the power amplifier 41, the terminal 56*b* may be connected to an input terminal of the power amplifier 42, NR signals may be input to the terminal 56*c*, and LTE signals may be input to the terminal 56*d*.

Accordingly, with the simplified switch circuit, when one of the LTE signal and the NR signal is amplified with the power amplifier 41, the other of the LTE signal and the NR signal can be amplified with the power amplifier 42.

In addition, for example, the radio frequency circuit 1 may further include a module substrate 90, and the filters 11, 21, and 31, the power amplifiers 41 and 42, and the switch 51 may be disposed in or on the module substrate 90.

Accordingly, the compact radio frequency circuit 1 capable of executing ENDC can be realized.

In addition, the communication device 4 according to the present embodiment includes the RFIC 3 which processes a radio frequency signal, and the radio frequency circuit 1 which transmits the radio frequency signal between the RFIC 3 and the antennas 2*a* and 2*b.ef*

Accordingly, the communication device 4 can achieve the same advantageous effects as the above-mentioned advantageous effects of the radio frequency circuit 1.

Other Embodiments

Although the radio frequency circuit and the communication device according to the present invention have been described based on the embodiment and modifications, the radio frequency circuit and the communication device according to the present invention are not limited to the embodiment and modifications described above. The present invention also includes other embodiments realized by combining any of the components in the above-described embodiment and modifications, modifications obtained by applying various modifications conceived by those skilled in the art to the above-described embodiment and modifications without departing from the spirit of the present invention, and various devices embedded with the above-described radio frequency circuit and communication device.

For example, in the circuit configuration of the radio frequency circuit and the communication device according to the above-described embodiment and modifications, additional circuit elements and wiring may be inserted between paths connecting the circuit elements and signal paths depicted in the drawings.

Also, although bands for 5G-NR or LTE are used in the above-described embodiment, communication bands for other radio access technology may be used in addition to or instead of 5G-NR or LTE. For example, communication bands for a wireless local area network may be used. In addition, for example, millimeter wave bands of 7 gigahertz or higher may be used. In this case, the radio frequency circuit 1, the antennas 2*a* and 2*b*, and the RFIC 3 constitute a millimeter wave antenna module, and distribution constant type filters may be used as filters, for example.

INDUSTRIAL APPLICABILITY

The present invention can be widely used in communication equipment such as cell phones as a radio frequency circuit disposed at the front end portion.

The invention claimed is:

1. A radio frequency circuit capable of simultaneously transmitting an LTE (Long Term Evolution) signal and an NR (New Radio) signal, the circuit comprising:

a first filter, a second filter, and a third filter;

a first power amplifier and a second power amplifier; and a first switch connected between (i) the first filter, the second filter, and the third filter and (ii) the first power amplifier and the second power amplifier;

wherein, when one of the LTE signal and the NR signal is amplified with the first power amplifier, an other of the LTE signal and the NR signal is amplified with the second power amplifier, the first switch enables connection between the first filter and the first power amplifier, enables connection between the third filter and the second power amplifier, and enables selective connection between the second filter and one of the first power amplifier and the second power amplifier, the first switch has a first common terminal, a second common terminal, a first selection terminal, a second selection terminal, and a third selection terminal, selectively switches connection between the first common terminal and the first selection terminal and connection between the first common terminal and the second selection terminal, and selectively switches connection between the second common terminal and the second selection terminal and connection between the second common terminal and the third selection terminal;

the first common terminal is connected to an output terminal of the first power amplifier;

the second common terminal is connected to an output terminal of the second power amplifier;

the first selection terminal is connected to an input end of the first filter;

the second selection terminal is connected to an input end of the second filter; and the third selection terminal is connected to an input end of the third filter.

2. The radio frequency circuit according to claim 1, wherein:

the first common terminal and the third selection terminal are not connected, and the second common terminal and the first selection terminal are not connected.

3. A radio frequency circuit capable of simultaneously transmitting an LTE (Long Term Evolution) signal and an NR (New Radio) signal, the circuit comprising:

a first filter, a second filter, and a third filter;

a first power amplifier and a second power amplifier; and a first switch connected between (i) the first filter, the second filter, and the third filter and (ii) the first power amplifier and the second power amplifier;

wherein, when one of the LTE signal and the NR signal is amplified with the first power amplifier, an other of the LTE signal and the NR signal is amplified with the second power amplifier, the first switch enables connection between the first filter and the first power amplifier, enables connection between the third filter and the second power amplifier, and enables selective connection between the second filter and one of the first power amplifier and the second power amplifier, wherein:

regarding a first band for frequency division duplex (FDD) composed of a first downlink operating band and a first uplink operating band, a second band for FDD composed of a second downlink operating band and a second uplink operating band, and a third band, following bands are positioned in a following order, from a low frequency side or a high frequency side: the third band, the second downlink operating band, the second uplink operating band, the first uplink operating band, and the first downlink operating band;

the first filter has a passband including the first uplink operating band;

the second filter has a passband corresponding to the third band; and the third filter has a passband including the second uplink operating band.

4. The radio frequency circuit according to claim 1, wherein:

following bands are positioned in a following order, from a low frequency side or a high frequency side: a third band, a second band, and a first band;

the first filter has a passband corresponding to the first band;

the second filter has a passband corresponding to the second band; and the third filter has a passband corresponding to the third band.

5. The radio frequency circuit according to claim 2, wherein:

the first band is band B8 for 4G-LTE or band n8 for 5G-NR;

the second band is band B20 for 4G-LTE or band n20 for 5G-NR; and the third band is band B28 for 4G-LTE or band n28 for 5G-NR.

6. The radio frequency circuit according to claim 5, wherein:

the third band is composed of a third downlink operating band and a third uplink operating band;

the second downlink operating band and the third downlink operating band partially overlap in frequencies; and the radio frequency circuit further comprises:

a fourth filter having a passband including the first downlink operating band; and a fifth filter having a passband including the second downlink operating band and the third downlink operating band.

7. The radio frequency circuit according to claim 3, wherein:

the first band is band B5 for 4G-LTE or band n5 for 5G-NR;

the second band is band B13 for 4G-LTE or band n13 for 5G-NR; and the third band is band B71 for 4G-LTE or band n71 for 5G-NR.

8. The radio frequency circuit according to claim 3, wherein:

the first band is band B71 for 4G-LTE or band n71 for 5G-NR;

the second band is band B12 for 4G-LTE or band n12 for 5G-NR; and the third band is band B5 for 4G-LTE or band n5 for 5G-NR.

9. The radio frequency circuit according to claim 3, wherein:

the second filter and the third filter are formed in or on a same chip.

10. The radio frequency circuit according to claim 9, wherein:

the second filter and the third filter are acoustic wave filters; and the second filter and the third filter are formed in or on a same piezoelectric substrate.

11. The radio frequency circuit according to claim 1, wherein:

regarding a first band for frequency division duplex (FDD) composed of a first downlink operating band and a first uplink operating band, a second band for FDD composed of a second downlink operating band and a second uplink operating band, and a third band, following bands are positioned in a following order, from a low frequency side or a high frequency side: the second uplink operating band, the first uplink operating band, the first downlink operating band, and the second downlink operating band;

the first filter has a passband including the first uplink operating band;

the second filter has a passband corresponding to the third band; and the third filter has a passband including the second uplink operating band.

12. The radio frequency circuit according to claim 11, wherein:

the first band is band B2 for 4G-LTE, band B25 for 4G-LTE, band n2 for 5G-NR, or band n25 for 5G-NR;

the second band is band B66 for 4G-LTE or band n66 for 5G-NR; and the third band is band B1 for 4G-LTE or band n1 for 5G-NR.

13. The radio frequency circuit according to claim 1, further comprising:

a second switch having a first terminal, a second terminal, a third terminal, and a fourth terminal, the second switch being capable of switching between a first connection state in which the first terminal and the third terminal are connected, and the second terminal and the fourth terminal are connected, and a second connection state in which the first terminal and the fourth terminal are connected, and the second terminal and the third terminal are connected, wherein the first terminal is connected to an input terminal of the first power amplifier;

the second terminal is connected to an input terminal of the second power amplifier;

the NR signal is input to the third terminal; and the LTE signal is input to the fourth terminal.

14. The radio frequency circuit according to claim 1, further comprising:

a module substrate, wherein the first filter, the second filter, the third filter, the first power amplifier, the second power amplifier, and the first switch are disposed in or on the module substrate.

15. A communication device comprising:

a signal processing circuit that processes a radio frequency signal; and a radio frequency circuit, which transmits the radio frequency signal between the signal processing circuit and an antenna, the radio frequency circuit capable of simultaneously transmitting an LTE (Long Term Evolution) signal and an NR (New Radio) signal, the radio frequency circuit comprising:

a first filter, a second filter, and a third filter;

a first power amplifier and a second power amplifier; and a first switch connected between (i) the first filter, the second filter, and the third filter and (ii) the first power amplifier and the second power amplifier;

wherein, when one of the LTE signal and the NR signal is amplified with the first power amplifier, an other of the LTE signal and the NR signal is amplified with the second power amplifier, and the first switch enables connection between the first filter and the first power amplifier, enables connection between the third filter and the second power amplifier, and enables selective connection between the second filter and one of the first power amplifier and the second power amplifier, wherein the first switch has a first common terminal, a second common terminal, a first selection terminal, a second selection terminal, and a third selection terminal, selectively switches connection between the first common terminal and the first selection terminal and connection between the first common terminal and the second selection terminal, and selectively switches connection between the second common terminal and the second selection terminal and connection between the second common terminal and the third selection terminal;

the first common terminal is connected to an output terminal of the first power amplifier;

the second common terminal is connected to an output terminal of the second power amplifier;

the first selection terminal is connected to an input end of the first filter;

the second selection terminal is connected to an input end of the second filter; and the third selection terminal is connected to an input end of the third filter.

16. The communication device of claim 15, wherein:

the first common terminal and the third selection terminal are not connected, and the second common terminal and the first selection terminal are not connected.

17. The communication device of claim 15, wherein:

regarding a first band for frequency division duplex (FDD) composed of a first downlink operating band and a first uplink operating band, a second band for FDD composed of a second downlink operating band and a second uplink operating band, and a third band, following bands are positioned in a following order, from a low frequency side or a high frequency side: the third band, the second downlink operating band, the second uplink operating band, the first uplink operating band, and the first downlink operating band;

the first filter has a passband including the first uplink operating band;

the second filter has a passband corresponding to the third band; and the third filter has a passband including the second uplink operating band.

18. The communication device of claim 15, wherein:

following bands are positioned in a following order, from a low frequency side or a high frequency side: a third band, a second band, and a first band;

the first filter has a passband corresponding to the first band;

the second filter has a passband corresponding to the second band; and the third filter has a passband corresponding to the third band.

* * * * *